3,811,987
APPARATUS FOR BONDING THERMOPLASTIC MATERIALS AND PRODUCTS THEREOF
Michael C. Wilkinson, St. Louis, Mo., and Leo Blais, Shawinigan, Quebec, and Wilhelm N. Martin and Silvano Tesainer, Grand'Mere, Quebec, Canada, assignors to Consolidated Paper (Bahamas) Limited, Nassau, Bahamas
Original application Apr. 28, 1969, Ser. No. 819,752, now abandoned. Divided and this application Feb. 22, 1972, Ser. No. 227,959
Claims priority, application Canada, Feb. 24, 1969, 43,756
Int. Cl. B31f 1/00
U.S. Cl. 156—497      3 Claims

ABSTRACT OF THE DISCLOSURE

This invention relates to the bonding of thermoplastic material, and more particularly to apparatus for forming corrugated paperboard by firstly applying a coating or film of thermoplastic material to the surfaces to be bonded and then heating the thermoplastic material by the direct application of an open flame to the thermoplastic surface. The open flame heats a surface layer of the thermoplastic material to render it bondable with the other element of the laminate. The disclosure also relates to an apparatus including means for supplying, corrugating and bonding coated paper to form corrugated paperboard, and to apparatus for uniting the paper and holding it together while the bonds cool and harden.

---

This is a division of application Ser. No. 819,752, filed Apr. 28, 1969 now abandoned.

FIELD OF THE INVENTION

This invention relates to the bonding of thermoplastic materials. In particular, this invention reuates to an improved apparatus for bonding thermoplastic materials at high speed. The invention also relates to the production of products such as corrugated paperboard which is coated with a thermoplastic material and bonded by an improved apparatus.

DESCRIPTION OF PRIOR ART

Sheets of thermoplastic material have previously been laminated by passing sheets between heated rollers and by applying pressure to form the laminate. In these known processes, the heating rollers convey heat to the surfaces of the thermoplastic material which are to be bonded by conduction through the thermoplastic material rather than by the direct application of heat to the surfaces which are to be bonded together. The indirect application of heat in this manner requires the laminating operation to be run at a relatively slow speed in order to ensure that sufficient heat is available to provide a complete bond. The speed of the known laminating processes can not be increased by increasing the temperature of the heating rollers above the melting temperature of the thermoplastic material without running the risk of frequent breakdowns in the apparatus resulting from minor stoppages and the build-up of thermoplastic material on the rollers.

Corrugated paperboard is used extensively in the packaging of a great many materials and numerous attempts have been made to increase the strength of the corrugated paperboard by the application of a thermoplastic film to at least one surface of the medium or liner. In addition to increasing the dry strength of paperboard a thermoplastic film may be employed to considerably improve the wet strength of paperboard. It has also previously been known to employ a thermoplastic polymeric material to form a bond between a medium and a liner. The actual use of this type of material has been restricted by the high production costs of the known methods and the cost of the thermoplastic film.

Much of the high cost of production results from the slow speed of operation which is required in order to ensure a proper bond between the corrugated medium and the liners. It is important in the known methods of production to carry out the bonding operation at a slow speed in order to provide sufficient time to heat the layer of thermoplastic material to a sufficient extent to ensure that it will form an adhesive layer.

In one known method of producing thermoplastic coated corrugated paperboard, the liner is coated with a layer of thermoplastic material and then brought into contact with the corrugated medium. The liner and the medium are then held in contact with one another and passed over a plurality of heating elements. In this method, heating occurs after the laminate has been formed. Consequently, the laminate must be held firmly together over a substantial portion of its length while the heat is applied. It has been found that with this method interruptions in the adhesion frequently occur due to the difficulties encountered in maintaining the liner and medium in the required intimate relationship for bonding. In addition, in this process the heat must be conducted through the body of the paperboard in order to heat the thermoplastic material and, due to the thermal insulation properties of the paperboard, this process is inefficient and time consuming.

In another known method of forming corrugated paperboard employing thermoplastic films as bonding material, a coated paperboard passes over the heated roller and is heated to a sufficiently high temperature to render the thermoplastic material adhesive. It will be apparent that, with this aype of heat conduction, it is important that the paperboard be in contact with the rollers for a period of time which is sufficient to ensure that the thermoplastic material is adequately heated. If the production speed is to be increased, then the temperature of the heated rollers must be increased. A further difficulty with the use of heated rollers lies in the fact that the rollers can not be placed in contact with the thermoplastic film which forms the surface of the coating of the paperboard as the heated rollers would heat the coating to a point where it would become an adhesive and would tend to stick to the surface of the roller.

In view of the fact that in each of the processes discussed in the preceding paragraphs, the heat which is required for heating the thermoplastic material is indirectly applied, it has not been possible to efficiently produce a waterproofed paperboard which has a thermoplastic coating such as polyethylene applied to all of the surfaces of the liner and the medium.

In both of the methods discussed above, a thermoplastic coating is heated by indirect heating means with the result that a considerable amount of time is required to heat the thermoplastic coating to an adhesive state, thus limiting the speed of operation of the processes. In addition, these processes require a lengthy cooling period in order to remove sufficient heat from the laminate to cause the thermoplastic material to set to form a rigid bond between the medium and the liner. Both of these features tend to limit the efficient use of a thermoplastic coating in the production of corrugated paperboard.

SUMMARY OF INVENTION

The present invention overcomes the difficulties of the prior art described above by providing an improved apparatus for bonding thermoplastic material to form a laminate. In particular, the present invention provides an improved apparatus wherein heat is applied directly to the surfaces of the laminates which are to be bonded together. Preferably, heat is applied by means of an open flame which plays directly onto at least one of the surfaces to be bonded together.

The apparatus provides an improved corrugated paperboard wherein the bond between the liner and the medium is effected by the direct application of heat to the thermoplastic coating which is bonded to at least one surface of the liner or medium. The corrugated paperboard produced by the present invention has an improved structural strength and wet strength. The corrugated paperboard also has sufficient bond strength to make it sufficiently flexible to permit it to be used in the folding box board industry.

According to an embodiment of the present invention, the bonding thermoplastic material to form a laminate involves the steps of applying heat directly to the surface of the thermoplastic coating to render the heated surface bondable with a juxtaposed surface of the second element or member of the laminate which may be a second thermoplastic material or paperboard or the like and pressing the heated surface into contact with said other member to form a laminate.

According to an important embodiment of this invention, a laminate can be very efficiently produced by bonding together two elements or members, at least one of which has a surface of thermoplastic material by applying heat directly to the surface of the thermoplastic material by the direct application of an open flame to render the heated surface bondable with a juxtaposed surface of the second element or member of the laminate which may be a second thermoplastic material or paperboard or the like and pressing the heated surface into contact with the other member to form a laminate.

According to yet another embodiment of the present invention, there is provided an improved apparatus for bonding at least two paperboard members together to form a laminate wherein each of the members has at least one surface coated with a film of thermoplastic material so that it can be bonded by applying heat directly to the thermoplastic coated surface of at least one of said members to render the surface bondable with the thermoplastic coated surface of the other of said members and pressing said coated surfaces into contact with one another to form a composite laminate.

The invention also provides apparatus for manufacturing waterproof corrugated paperboard consisting of at least one liner member and one corrugated medium wherein both the inner and outer surfaces of the liner and the corrugated medium are coated with a film of thermoplastic material. The apparatus operates by continuously applying heat directly to a thermoplastic coated surface of at least one of said members by the direct application of an open flame to render the heated surface bondable with the juxtaposed surface of the other member and pressing the heated surface into contact with the other juxtaposed surface to form a composite corrugated paperboard laminate.

The invention will be more clearly understood after reference to the following detailed specification read in conjunction with the drawings, wherein:

FIG. is a diagrammatic illustration of an apparatus for producing corrugated paperboard according to an embodiment of the present invention;

It will be understood that, while the following detailed description of a preferred embodiment of the invention relates to the production of corrugated paperboard, the present invention is not limited to the production of corrugated paperboard. As previously indicated, the present invention may be used in the production of any form of laminate wherein the bond between the members which form the laminate is provided by the thermoplastic material. For example, the present invention may be used to laminate two sheets of thermoplastic material to one another or to laminate a thermoplastic sheet of material to conventional kraft paper or to aluminum foil or other similar materials. Suitable thermoplastic materials such as polyethylene, polyvinylalcohol, polyvinyl acetate, cellulose acetate, nylon, Teflon (trademark) or polypropylene may be bonded by the method of the present invention.

According to a preferred embodiment of this invention, the paperboard which is to be used for the liners and the medium of the corrugated paperboard is firstly laminated to or coated with a film of thermoplastic material such as polyethylene or a hot melt blend of paraffin and/or microcrystalline waxes with copolymers of ethylene vinyl acetate or ethylene ethyl acrylate or ethylene isobutyl acrylate along with synthetic hydrocarbon or terpene resins, butyl rubber, polyisobutylene and synthetic waxes. The film of polyethylene or hot melt may be applied in the continuous process of the apparatus described hereinafter or it may be applied to the surface of the paperboard before it passes to the corrugating apparatus of the present invention.

Figure 1:
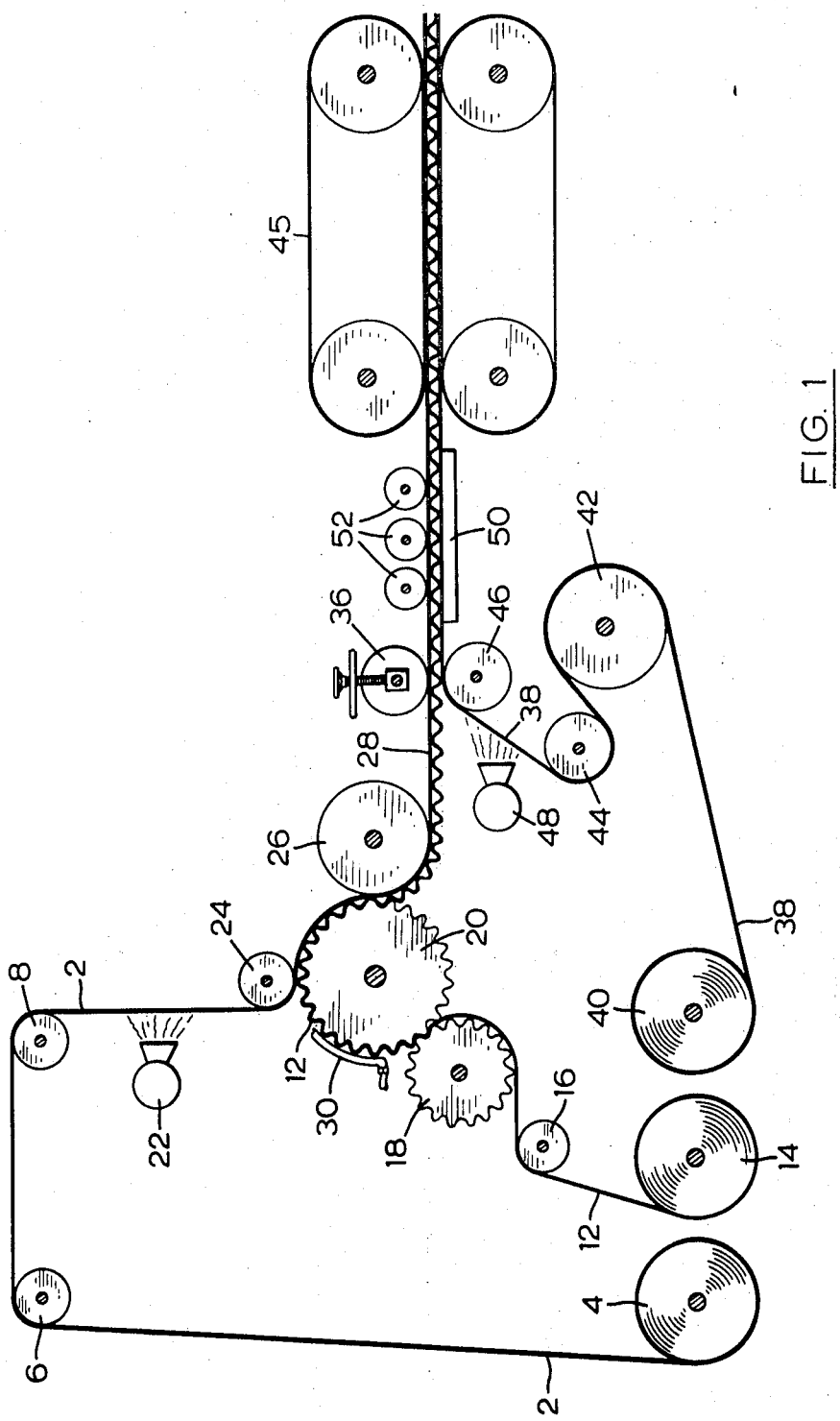

Referring now to FIG. 1 of the drawings, a liner 2 which, as previously described, is coated with a film of thermoplastic material or hot melt of thermoplastic material is passed from an uncoiling drum 4 over guide rollers 6 and 8. The guide roller 6 is preferably in the form of a jockey roller adapted to take up any slack in the unwinding liner and to provide a uniform tension in the liner. The corrugated medium 12 is unwound from an uncoiling drum 14 and passed over an idler roller 16 and then between the corrugator rollers 18 and 20. The corrugator rollers 18 and 20 are preferably preheated by the circulation of steam or by the location of other suitable heating means within each roller. Referring again to liner 2, it will be seen that, after passing over the roller 8, an open flamed burner 22 directs a flame against the coated surface of the liner prior to the point where the liner 2 and the corrugated medium are brought into contact with one another between the corrugator roller 20 and the adjustable gap roller 24. The gap roller 24 is preferably hollow and heated by the circulation of steam or hot air or the like. The burner 22 may be a propane air or acetylene oxygen burner or other similar fuel burner which provides a flame which may be directed against the thermoplastic coated surface of the liner 2. In the apparatus illustrated in the drawings, the flame is applied at a point sufficiently close to the roller nip to ensure that the thermoplastic material will be sufficiently hot at the nip for bonding while the flame is preferably spaced at sufficient distance from the nip to ensure that the rollers 20 and 24 will not become overheated and the flame will not blow back by being constricted in the nip area of the rollers. However, depending on the nature of the thermoplastic surface, the size of the flame required, the design of the flame nozzle, etc., the flame can, in certain circumstances, be directed with advantage directly into the nip of rollers 20 and 24. Preferably, the reducing part of the flame is directed against the coated surface as it has been found that the bond strength is increased substantially by using the reducing part of the flame in the heating of the thermoplastic coating. It has been found that the oxidation of the surface coating tends to reduce the surface strength of the bond formed by laminating the thermoplastic liner and medium. However, in some applications it is a practical advantage to sacrifice a certain amount of bond strength to take advantage of the oxidizing part of the flame which, being the hottest part of the flame, will allow the speed of operation to be increased. The heated rollers 18, 20 and 24 heat the liner and the medium 12 to a temperature which is lower than the actual melting point of the thermoplastic coating while the open flame provided by the burner 22 serves to render the surface of the thermoplastic coating bondable prior to entering the nip between the guide roller 24 and the corrugated roller 20.

While the direct application of heat to the surface to be bonded may be achieved by the use of heating means other than the direct flame described above it has been found that the direct flame application offers many additional advantages not provided by other heating means. For example, the time required to heat the surfaces by means of a presently available radiant heater element is too great to permit the laminating operation to run at the required high speeds. The cost of operating the type of radiant heater that is presently available is generally substantially greater than the cost of operating an open flame burner. If hot air is used to achieve the melting of the thermoplastic material, the oxidization of the surface will again occur while, if an inert gas is used, the cost of producing and heating the inert gas adds considerably to the production costs. While initially it may appear that it would be desirable to avoid using an open flame in the forming of a laminate of thermoplastic material, particularly where paperboard is a composite part of the laminate, we have found that the advantages derived from the use of an open flame are substantial in reducing the cost of production and providing a laminate which has a very good bond strength.

The heat supplied by the burner is sufficient to render the heated thermoplastic surface of the liner 2 bondable with the thermoplastic surface of the medium when they are pressed into contact with one another between the adjustable gap roller 24 and the roller 20. After leaving the corrugating roller 20, the laminate formed by the corrugated medium 12 and the liner 2 passes over a cooling roller 26 which effects a rapid cooling of the bond between the liner and the medium. The cooling roller 26 may be cooled by the circulation of cooling water or the like therethrough. The corrugated medium 12 is held in contact with the corrugator roller by means of a plurality of fingers 30 which are also cooled to avoid overheating as a result of the proximity to the heating flame and heated corrugator roller. It will be noted that the liner 2 extends over an arc of at least 90° of the corrugator roller and tension is applied to this portion of the liner 2 by the gap roller 24 and cooling roller 26 operating in conjunction with belt conveyor 45 such that the liner 2 is pressed firmly against the crests of the corrugated medium. This differs from the conventional practice when the bonding is carried out only between the nip of the rollers with the result that the adhesion tends to be discontinuous because the liner and medium are not held in contact with one another over a sufficiently long period of time. This improved apparatus eliminates the problem known in the industry as the production of "highs and lows." The problem has been that there is a tendency in the industry to form corrugated paperboard wherein the height of the corrugation is inconsistent. This is overcome by the improvement described above by retaining the liner and medium in contact with the roller 20 until the bond is complete such that no relative movement will occur between the liner and medium. In some instances, it may be desirable to locate additional heating means between the rollers 24 and 26 to heat the liner as it passes through this area to ensure uniform bonding before cooling takes place at roller 26.

The single-faced corrugated paperboard which is the product produced by this first bonding operation may be wound onto a suitable coiler to provide a finished product where single-faced corrugated paperboard is the end product required. Alternatively, the single-faced corrugated paperboard generally identified by the reference numeral 28 passes to the second laminating station which will be described hereinafter to form a double-faced corrugated paperboard. The single-faced paperboard passes under a further adjustable pressure roller 36 at the entry to the second laminating station. A second liner 38 of the same material as the liner 2 is unwound from an uncoiling drum 40 and fed over a series of preheated rollers 42, 44 and 46 which preheat the liner 38 prior to the forming of the bond. A burner 48 which is similar to the burner 22 directs an open flame against the surface of the liner 38 which is to be laminated with the single-faced corrugated paperboard 28 between the rollers 36 and 46. The roller 36 is preferably cooled by the circulation of a cooling liquid in order to prevent reheating of the bond formed between the corrugated medium and the liner in the earlier described operation. The double-faced laminate which passes from the rollers 36 and 46 is supported by a table 50 at the exit from the rollers and a series of three free floating rollers 52 bear down upon the upper surface of the liner. The table 50 is again preferably cooled by the circulation of a cooling liquid such that the bond between the medium and the liner 38 will be cooled rapidly after leaving the pressure rollers 36 and 46. The double-faced corrugated paperboard then passes between a double belt conveyor generally indicated by the reference numeral 45. The conveyer 45 pulls the corrugated product through the system of rollers. It is understood, of course, that depending on the particular situation, e.g. linear speed of the paperboard, size of the roller, etc., some of the rollers or drums will be freely rotatable, others slightly braked, to avoid slack tensions and, in certain cases, to avoid undue strain on the paperboard some may be separately driven with their speeds properly synchronized so that proper tensions are maintained, especially in the contact arc area about corrugating roller 20.

Figure 2:
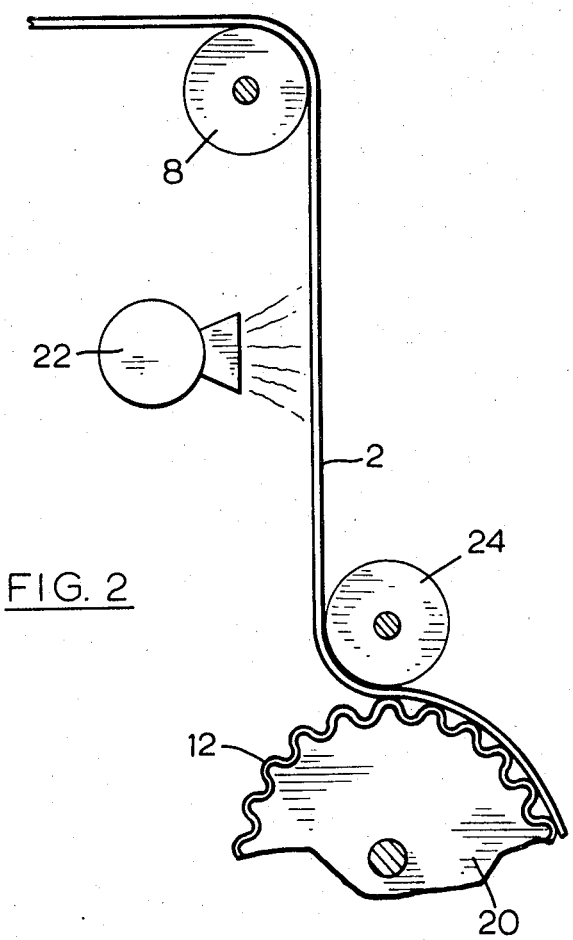
FIG. 2 is an enlarged detail view indicating the manner in which the heat is applied directly to the thermoplastic coating.

In FIG. 2 of the drawings, the manner in which the bond is formed by means of an open flame is illustrated in more detail. FIG. 2 illustrates the bonding of the first liner 2 to the corrugated medium 12. However, it will be understood that in principle, it illustrates a bonding method which is the same as that used to bond the corrugated paperboard 28 to the liner 38. The burner 22 projects a flame directly against the thermoplastic coated surface of the liner 2 to render the surface layer of the thermoplastic material bondable with the corrugated medium 12. The liner 2, corrugated medium 12 and liner 38 pass between the rollers 36 and 46 and are held together over a predetermined period of time, as previously described above.

While the bond may be formed by the direct application of heat from a heat source such as a radiant heater or hot air, we have found that the strength of the bond is improved substantially by the direct application of the reducing portion of an open flame to the thermoplastic coated surface described above. Laminates prepared by the application of the oxidizing portion of a flame has been found to give a poorer interface bond than that formed when the reducing portion of a flame is used. The use of an open flame in the forming of the bond permits the apparatus to run at high speeds because of the higher rate of heat transfer. A suitable flame for the bonding operation may be provided by several known fuel mixtures such as burning propane-air or acetylene-oxygen. Still higher rates of heat transfer as well as more efficient use of the heat produced can be achieved by proper flame-nozzle (burner) design and by using higher velocities for the burning gases as they pass over the thermoplastic surfaces.

Various tests were carried out on laminates which were coated with polyethylene films and formed by the method of the present invention and by a conventional heated roller method and the following table of results set forth the percentage of original characteristics which were retained.

METHODS TESTED

|  | Flame seal | | Heat seal | |
|---|---|---|---|---|
|  | Shear | Peel | Shear | Peel |
| Tensile, percent retained | 102-107 | 78-83 | 87-95 | 81-89 |
| Elongation, percent retained | 65-70 | 18-23 | 31-49 | 41-56 |

The strength of a flame seal under shear forces is superior to the strength of a heat sealed laminate. Flame seals also retain the highest percentage of the original elongation indicating almost unchanged bulk properties.

Replacing one of the polyethylene webs by kraft paper and using the same feeding and heating arrangement, good polyethylene paper laminates were obtained. On manual separation of the bond, the bonded area remained covered with a layer of paper fibres. No problems such as burning or creasing of the paper were encountered.

Films sealed were Teflon (trademark) to Teflon, polyvinyl alcohol to polyvinyl alcohol, polyvinyl acetate to polyvinyl acetate, cellulose acetate to cellulose acetate and Nylon to Nylon. Dissimilar materials such as aluminum foil to polyethylene were also successfully flame sealed indicating that non-thermoplastics may be flame sealed to thermoplastics. This, however, is limited to their mutual compatibility of the wettability of the non-thermoplastic surface by the melted thermoplastic surface.

Excellent bonds of polyethylene to itself and kraft paper were obtained with an acetylene-oxygen flame at speeds of 100 to 200 ft./min. Polyethylene films of 6, 3 and 1 mil thickness can be flame sealed without film burn-through or film distortion. Flame seals of polyethylene are as strong as the original film when tested under shear forces and reach 83 percent of the original film strength under 90° peel forces.

Figure 3:
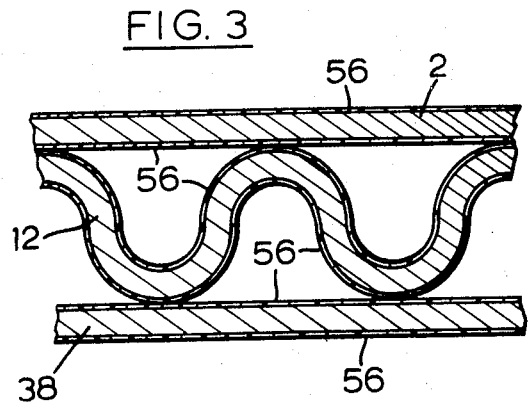
FIG. 3 is a cross-sectional view of a waterproof corrugated paperboard according to an embodiment of this invention.

A product according to an embodiment of the present invention is illustrated in FIG. 3. The product is a double-faced corrugated paperboard consisting of a liner 2, medium 12 and a liner 38. Each surface of the liner 2, medium 12 and liner 38 is covered with a coating or film of thermoplastic material 56 and the liners are bonded to the medium by the bond formed by heat sealing the two abutting layers of thermoplastic material. While it has previously been known to produce a corrugated paperboard wherein the liner and the medium are bonded to one another by means of a layer of thermoplastic material, it has not previously been possible to produce corrugated paperboard in which all of the surfaces were covered with thermoplastic material. Failure to produce such a material has resulted from the fact that, by previous methods, the bonding was achieved by the use of heated rollers which did not apply heat directly to the surface which was to be bonded but rather transmitted heat to a surface which was remote from the bonding surface and relied upon conduction through the paperboard to convey heat to the bonding surfaces. While in the present invention the heated rollers may be used to preheat the liners and the medium, these rollers do not at any time heat the thermoplastic coated surfaces to a temperature above the melting point of the thermoplastic material and consequently there is no tendency for the thermoplastic material to adhere to the rollers. It is, therefore, by means of the present invention that the applicant is able to produce a corrugated paperboard which has a thermoplastic covering or coating on each surface thereof. The thermoplastic coating on each surface of the corrugated paperboard provides a corrugated paperboard which has a very greatly improved wet strength over that previously described and an increased flexibility to such an extent that it may conveniently be used in the folding box board industry.

This invention also provides a substantial saving in thermoplastic material as films of 1 mil or less in thickness can be used to cover these paperboard products. With previous methods, the overheating of the materials resulted in the thermoplastic films melting and penetrating into the porous structure of the paper product with the resultant destruction of the film as a barrier to certain materials. Except for high web speeds, it may be found desirable not to preheat the coated paperboard or at least do so very carefully, whenever very thin films of thermoplastic material are being used. Also, as one uses finer film thicknesses, the prevalence of pin-holes or damaged areas in the surface of the film increases and this in turn decreases the waterproofness or wet strength of the paper product. To offset this situation, it has been found that the prior to covering the surface with a thermoplastic material, the paper material should be properly sized in a manner conventionally understood in the pulp and paper trade.

In the above, mention has been made of the use of the present invention for materials, such as paperboard, to the surfaces of which specific thermoplastic films have been laminated or whose surfaces have been coated with thermoplastic materials such as paraffin wax, or blends of paraffin wax and microcrystalline waxes or blends of these waxes with one or more plastic materials such as polyolefins, etc. (which latter blends of materials are commonly known as hot melts). Since these two groups of thermoplastic materials, plastic films on the one hand and wax blends on the other, generally fall into separate distinct groups with the plastic films being the more difficult groups to bond either to themselves or to a non-thermoplastic material, it will be noted that this invention now makes possible the bonding together of these more difficult thermoplastic materials. Also, since these films provide tougher, less friable, and higher moisture and temperature resistance properties to the surfaces so covered by these films, and tend to remain on the surface where they are required (rather than penetrate the surface), this invention provides for the production at minimum cost of products having such properties.

What we claim is:

1. Apparatus for producing paperboard including a corrugated medium bonded to a liner on at least one side of the medium wherein the inner surface of the liner which mates with the medium is coated with a thin layer of thermoplastic material, the apparatus comprising:
   (a) sheet material supply means for delivering sheet material for the liner and for the medium;
   (b) first and second meshing corrugated rolls for drawing sheet material from the supply means and corrugating the material therebetween;
   (c) means to maintain the corrugated sheet material meshed in the second corrugated roll beyond said first corrugated roll and between two points spaced apart by an annular distance around the periphery of the second roll and including first and second liner tensioning rollers disposed to draw coated sheet material from said supply means into the nip between the first tensioning roller and the second corrugated roll and to tension the liner against the corrugated medium in an arc around the periphery of the second corrugated roll between said spaced points; and
   (d) burner means operative to direct a flame against the thermoplastic coating of said inner surface to soften it all the way across the liner just before it passes into said nip, said annular distance between said points around the second corrugated roll being great enough to permit the thermoplastic material to harden before the medium with the liner bonded to one side of it emerges from between the second tensioning roller and the second corrugated roll.

2. Apparatus as set forth in claim 1, for producing double faced paperboard having a second liner bonded to the other side of the medium, and the second liner also having its inner mating surface coated with a thin layer of thermoplastic material, the apparatus further comprising opposed rollers having a second nip therebetween disposed to draw the corrugated medium and first liner from the second corrugated roll and to draw sheet material for the second liner from said supply means with the coated surface of the second liner in contact with said other side of the corrugated medium; second burner means operative to direct a flame against the thermoplastic layer on said inner surface of the second liner to soften it all the way across the liner just before it enters the second nip; and holding means beyond said opposed rollers to hold the second liner against the corrugated medium until its thermoplastic layer hardens.

3. Apparatus as set forth in claim 1, including retaining means extending between the mesh of the corrugated rolls and the nip between the second corrugated roll and the first tensioning roller and operative to maintain the corrugated medium meshed with the second corrugated roll, and said opposed rollers and said holding means being disposed with respect to said second corrugated roll and said tensioning roller such that the paperboard is flattened and held flat after it leaves the second corrugated roll.

References Cited

UNITED STATES PATENTS

| | | | |
|---|---|---|---|
| 2,423,870 | 7/1947 | Blessing | 156—208 |
| 3,644,159 | 2/1972 | Edkvist | 156—82 |
| 2,381,942 | 8/1945 | Wickwire | 118—47 |
| 2,398,398 | 4/1947 | Abbott | 156—497 |
| 3,524,425 | 8/1970 | Barnes et al. | 118—47 |
| 2,767,103 | 10/1956 | Loukomsky | 118—47 |
| 3,640,788 | 2/1972 | Flynn | 156—497 |

ALFRED L. LEAVITT, Primary Examiner

C. WESTON, Assistant Examiner

U.S. Cl. X.R.

156—82, 205, 208, 210, 462, 471